March 8, 1960  J. D. LESLIE ET AL  2,927,655
VACUUM OPERATED SEAT BACK LOCK
Filed Oct. 13, 1958  4 Sheets-Sheet 1
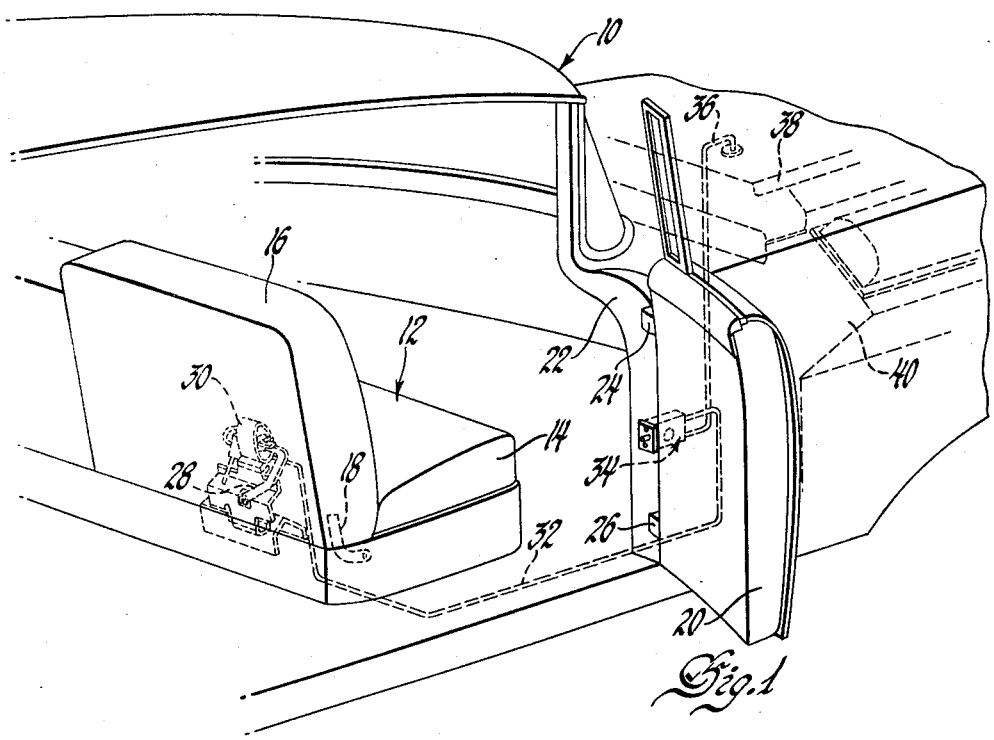
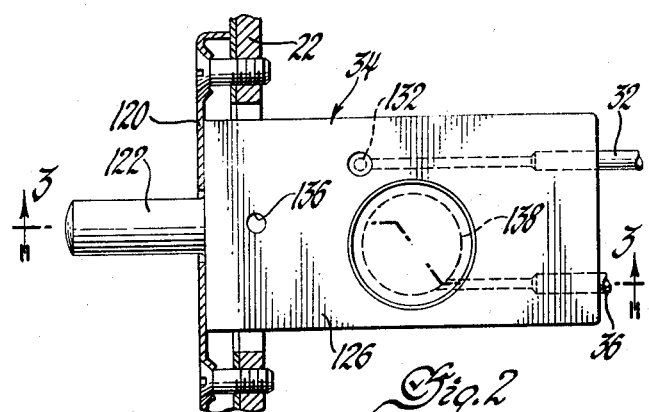
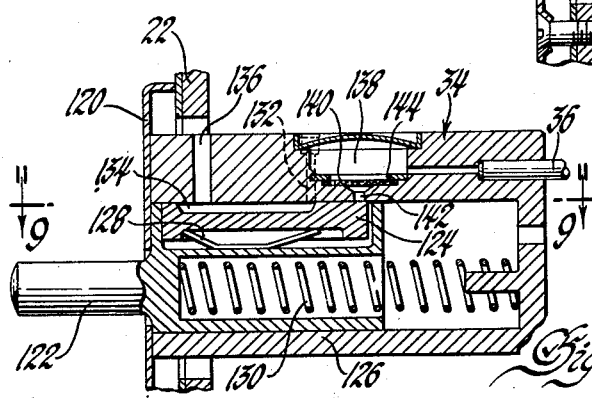
INVENTORS
James D. Leslie &
Gerhard Rehtrugler
BY
J.W. Christen
ATTORNEY March 8, 1960  J. D. LESLIE ET AL  2,927,655
VACUUM OPERATED SEAT BACK LOCK
Filed Oct. 13, 1958  4 Sheets-Sheet 3

INVENTORS
James D. Leslie &
Gerhard Rehfuger
BY
E. W. Christen
ATTORNEY

March 8, 1960 J. D. LESLIE ET AL 2,927,655
VACUUM OPERATED SEAT BACK LOCK
Filed Oct. 13, 1958 4 Sheets-Sheet 4
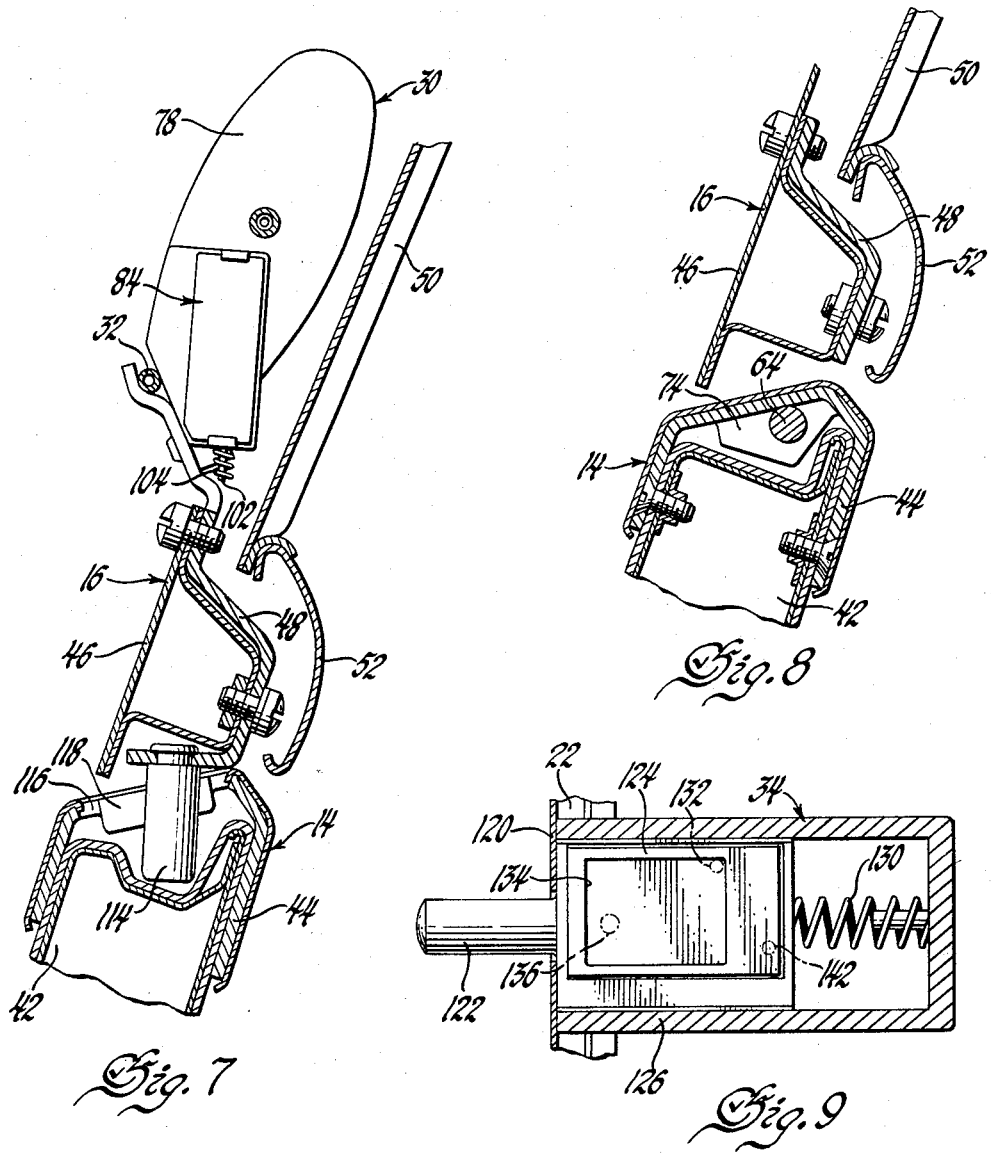
INVENTORS
James D. Leslie &
Gerhard Rehkugler
BY
E. W. Christen
ATTORNEY

United States Patent Office 2,927,655
Patented Mar. 8, 1960

2,927,655

VACUUM OPERATED SEAT BACK LOCK

James D. Leslie, Birmingham, and Gerhard Rehkugler, Warren, Mich., assignors to General Motors Corporation, Detroit, Mich., a corporation of Delaware Application October 13, 1958, Serial No. 766,763

2 Claims. (Cl. 180—82)

This invention relates to a latch and more particularly to a vacuum operated latch for an automobile tilting seat back.

Many automotive vehicles have only a single door on each side of the body and access to the rear seat is accordingly facilitated by providing the front seats with tilting seat backs. In the event of a sudden stop, a rear seat passenger might tilt the front seat back forwardly and thus push a front seat passenger towards the windshield and dashboard or, even worse, might so distract the driver as to occasion his loss of control of the vehicle.

The invention provides a novel safety mechanism wherein the tilting seat back is provided with a latching mechanism that is operated by a servo-motor fed by engine vacuum under the control of a door operated valve so that the seat back will be locked in the upright position whenever the engine is operative with the door in closed position. The seat back is automatically unlocked whenever the door is opened or the engine is stopped to provide easy access to the rear seat.

The invention also features a means to provide a slight time delay in latch unlocking in the event the engine stops while the door is closed. The time delay is preferably of a few minutes duration so that the vehicle can come to rest if the stopping of the engine was occasioned by a collision.

The invention also provides a means to prevent the latch from moving to locked position until the seat back is in upright position so that a tilted seat back will not be locked out of the upright position if the door is closed with the engine operative.

Other features of the invention will be apparent from the following description and drawings, in which:

Figure 1 is a fragmentary rear perspective view of the front passenger compartment of an automobile;

Figure 2 is a partial section through the front door pillar illustrating the door operated vacuum control valve in elevation;

Figure 3 is a section taken along line 3—3 of Figure 2;

Figure 7 is a section taken along the line 7—7 of Figure 4;

Figure 8 is a section taken along the line 8—8 of Figure 4; and

Figure 9 is a section taken along the line 9—9 of Figure 3.

Figure 4:
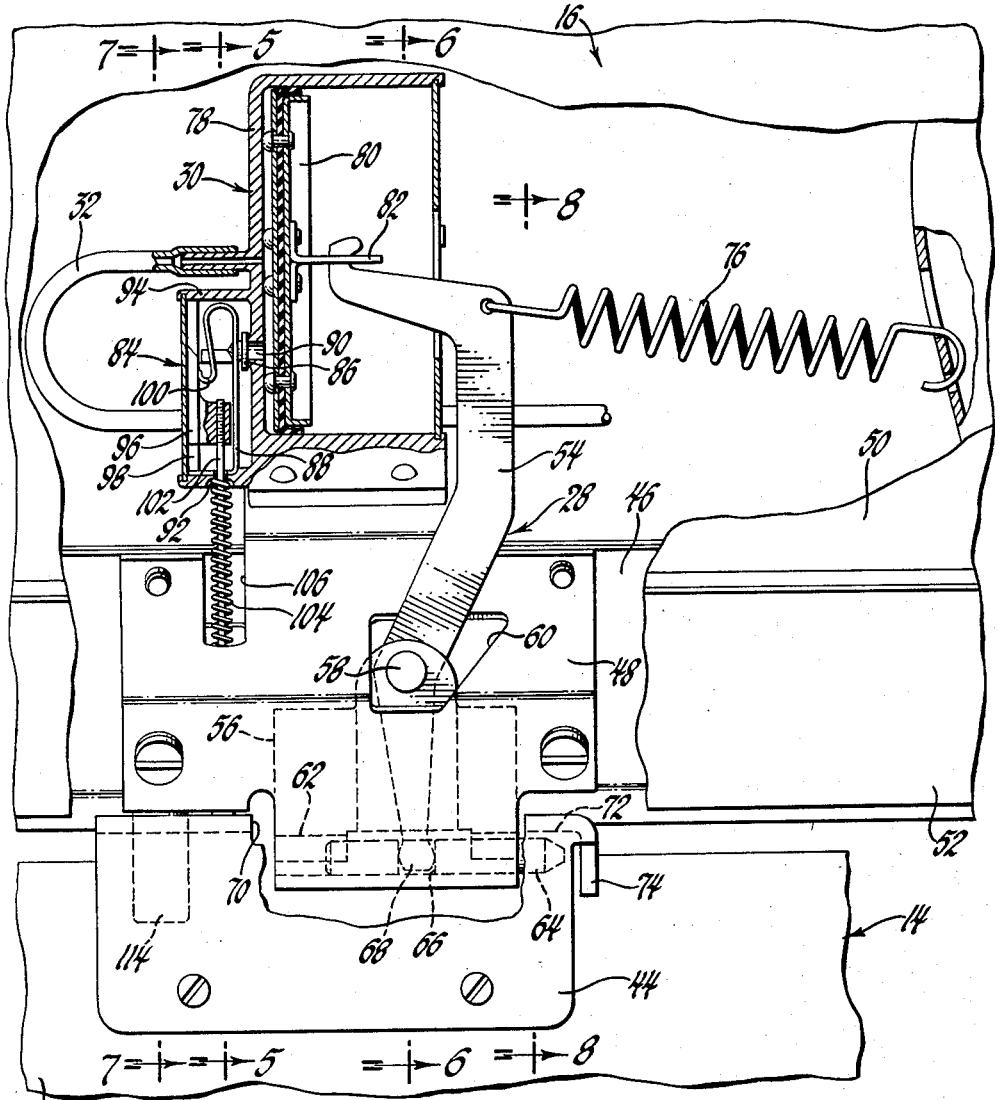
Figure 4 is a fragmentary view of the rear of the front seat and is partially broken away to show the latching mechanism and vacuum operated servometer therefor.
Figure 5:
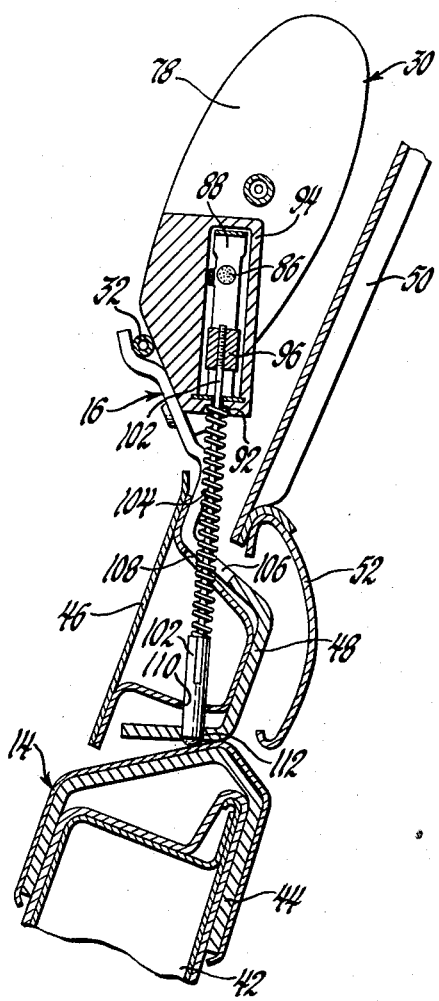
Figure 5 is a section taken along the line 5—5 of Figure 4.
Figure 6:
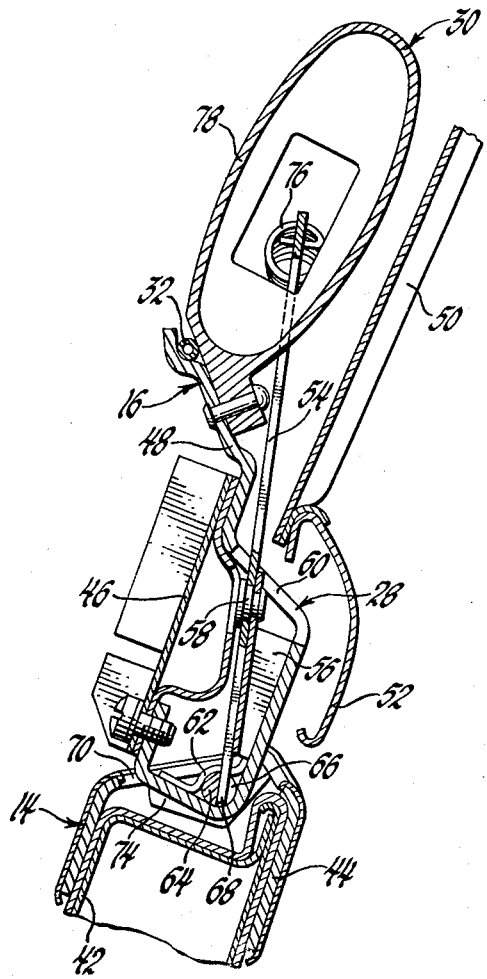
Figure 6 is a section taken along the line 6—6 of Figure 4.

Referring to the drawings, the automobile 10 has a front seat 12 which is mounted on the usual seat adjuster (not shown). The seat 12 has a bottom portion 14 and a back portion 16 mounted thereon for forward swinging movement by hinging 18. A front door 20 is carried on a pillar 22 by hinges 24 and 26 in the usual fashion.

The invention provides a latching mechanism 28 for the seat bottom and back and is operated by a servomotor 30 through a conduit 32, a door operated valve 34 and a conduit 36 which connects to the intake manifold 38 of the engine 40. Only the right seat back and right door are shown in the interest of brevity but a similar arrangement is provided for the left seat back and left door.

The seat bottom portion 14 includes a primary frame 42 which has a catch member 44 mounted on the upper rear edge thereof. The seat back portion 16 has a primary frame member 46 to which is secured a latch bracket 48 that mounts the latching mechanism 28 and servomotor 30. The latching mechanism 28 is concealed by a trim panel 50 and molding 52 carried by the frame member 46.

The latching mechanism 28 comprises a lever 54 which is pivoted to an internal bracket 56 of the latch bracket 48 by a rivet 58, the bracket 48 being slotted at 60 to receive the lever. The internal bracket 56 includes a bottom flange 62 which is spaced from the inner wall of the bracket 48 to provide a cylinder for a reciprocal latch bolt 64. A slot 66 in the latch bolt 64 receives the lower end 68 of the latch lever 54 and the bolt is thus reciprocated by swinging movement of the lever.

The catch member 44 has an opening 70 so that the bolt 64 will be located beneath the catch underside surface 72 when the seat back 16 is in upright position. The bolt 64 can thus be extended, as in Figure 4, and the seat back locked against forward tilting by the bolt's engagement with the catch surface 72. A tab 74 prevents overextension of the bolt.

A tension spring 76 is secured between the upper end of the latch lever 54 and the seat back 16 to urge the latch bolt 64 to unlocked position. The servomotor 30 provides a means to overcome the spring and place the latch bolt in locked position and includes a cylinder 78 connected to the vacuum conduit 32. A piston 80 is reciprocal in the cylinder 78 and has a bracket 82 hooked to the upper end of the latch lever 54 to swing the same.

It is apparent that the application of vacuum to the servomotor 30 will engage the latch bolt 64 in the catch 44 providing the seat back 16 is in upright position. A seat operated valve 84 is mounted on the servomotor cylinder 78 to open the cylinder to atmosphere when the seat back is tilted to prevent the latching mechanism 28 from moving toward locked position. The seat back is thus always able to move to the upright position where locking can occur.

The seat operated valve 84 includes a plug 86 carried by a leaf spring 88 which urges the plug away from a passage 90 that communicates with the interior of the cylinder 78. A bore 92 in the wall of the valve housing 94 communicates with atmosphere so that vacuum build-up in the cylinder 78 cannot occur unless the plug 86 is seated. A cam member 96 is slidable in a track 98 that is slotted in the inner wall of the valve housing 94 and the cam member engages the free end 100 of the spring 88 to seat the plug 86. An actuator rod 102 is threaded to the cam member 96 and is biased in a downward direction by a compression spring 104. The actuator rod 102 passes through a slot 106 and passages 108, 110 and 112 in the bracket 48 and frame 46 so that the end of the rod will engage the upper edge of the catch member 44 when the seat back is in upright position. The valve plug 86 is thus seated when the seat back is upright and is unseated when the seat back is tilted. If desired, a pin 114 may be riveted to project from the lower edge of the latch bracket 48 for entry in a slot 116 in the catch member 44, the slot being provided with tapered walls 118 which engage the pin to insure accurate registration of the latching elements when the seat back is upright.

The door operated valve 34 is mounted in the door pillar 22 by an escutcheon plate 120 and has a reciprocal plunger 122 that is engageable with the front edge of the door 20. The plunger 122 carries a slide valve 124 which is urged against the inner wall of the valve housing 126 by a leaf spring 128. When the door is open, a compression spring 130 places the plunger 122 and slide valve 124 in the position shown in Figure 3. The conduit 32 from the servomotor 30 communicates with a passage 132 in the valve housing 126 and the slide valve 124 has a cavity 134 which places the passage 132 in communication with atmosphere by a passage 136 when the door is open. The conduit 36 from the intake manifold 38 connects to a door valve chamber 138 which contains a resilient check valve 140 controlling the entrance to a passage 142 by a ring of perforations 144. When the door is closed, the slide valve cavity 134 connects passages 132 and 142 and engine vacuum lifts the check valve 140 to put the passage 142 in communication with the chamber 138 so that intake manifold vacuum can operate the servomotor 30 to lock the seat back in upright position. If a collision occurs causing the engine to stop, loss of engine vacuum will seat the check valve 140 and close off the passage 142. Vacuum is thus trapped in the servomotor 30 to keep the latch locked until the vacuum is dissipated by leakage due to manufacturing tolerances. The arrangement is such as to produce a few minutes time delay before the vacuum is dissipated and this insures that the seat back will remain locked in upright position until the vehicle comes to rest.

While the embodiment of the invention here described is preferred, it is understood that modifications may be made by the exercise of skill in the art which will lie within the scope of the invention.

We claim:

1. In a vehicle of the type having a vacuum source dependent upon engine operation, a door, a seat including a bottom portion and a hinged back portion forwardly tiltable from an upright position, a catch secured to one seat portion, and a latch secured to the other seat portion and engageable with the catch when the back portion is upright to lock the back portion against accidental tilting; the improvement comprising a spring arranged to move the latch to unlocked position, a vacuum operated servomotor arranged to move the latch to locked position, a door operated valve connected to the servomotor and the vacuum source and atmosphere and operative to place the servomotor in communication with the vacuum source when the door is closed to lock the latch and in communication with atmosphere when the door is open to unlock the latch, and a seat operated valve connected to the servomotor and atmosphere and operative to place the servomotor in communication with atmosphere when the back portion is tilted and to cut off communication with atmosphere when the back portion is upright so that the latch cannot move to locked position unless the back portion is upright.

2. Apparatus according to claim 1 including a check valve connecting the door operated valve to the vacuum source and operative to close off communication therebetween on loss of vacuum at the vacuum source to provide a slight time delay in the latch unlocking should the engine become inoperative when the door is closed.

References Cited in the file of this patent
UNITED STATES PATENTS

| | | |
|---|---|---|
| 2,340,424 | Ott | Feb. 1, 1944 |
| 2,815,796 | Lobanoff | Dec. 10, 1957 |